United States Patent Office 3,073,718
Patented Jan. 15, 1963

3,073,718
MAINTENANCE COATING
Albert H. Lund, McKees Rocks, Pa., assignor, by mesne assignments, to Martin-Marietta Corporation, Chicago, Ill., a corporation of Maryland
No Drawing. Filed Apr. 21, 1959, Ser. No. 807,747
19 Claims. (Cl. 117—104)

The present invention relates to the spray coating of aromatic solvent-soluble copolymers of vinyl chloride and vinylidene chloride to produce thick films with a single spray application. The invention includes the coating method which is used and the solution coating compositions employed.

It is known that certain aromatic solvent-soluble copolymers of vinyl chloride and vinylidene chloride may be dissolved in aromatic hydrocarbon solvents to provide coating solutions of high solids content relative to vinyl chloride-vinyl acetate copolymer coating solutions of comparable viscosity. These solutions may be applied to a base in various ways. When spray application is employed using coating compositions at room temperature, good films having a thickness of one or one and one-half mils may be produced. When thicker films are desired, they cannot be produced by a single spray application because the wet film tends to run and sag. This increases the difficulty of obtaining thick films on metal bases which are desirable for maintenance coating application. The use of heated spray solutions permits formation of films having a thickness up to about 3 mils, but hot spraying as a spray procedure is not well adapted to field application.

It is also known that the maximum thickness which can be achieved by a single spray application can be increased by the utilization of bentonite clay-organic base reaction products such as the "Bentone" products produced by National Lead Company. However, the maximum thickness which can be achieved in this manner using spray application is limited because introduction of the "Bentone" thickening agent unduly increases the initial viscosity of coating solutions thereby preventing spray application when the coating composition is sufficiently thickened to permit thick layers to resist running and sagging. Thus, the mere use of thickening agents does not enable coating thicknesses of approximately five mils or greater thickness to be produced.

The present invention is directed to coatings containing solutions of vinyl chloride-vinylidene chloride copolymers in solvent medium comprising large proportions of inexpensive aromatic solvents which may be applied by spraying to form continuous and relatively non-porous or non-pebbley protective coatings which desirably have a thickness of at least about 5 mils and without encountering undesirable running and sagging.

The invention relies upon the simultaneous inclusion in relatively concentrated coating compositions containing said copolymers of a thickening agent which is a reaction product of an acidic clay with a basic organic compound and a volatile polar component which will be rapidly eliminated from the coating composition during or immediately following spray application. In this manner, there is provided a rapid increase in viscosity and thixotropic thickening action so that coating solutions of sprayable viscosity may be formulated which, upon spray application, will thicken rapidly so that films having a thickness of from about 5 to about 20 mils may be applied in a single spray application with the rapid increase in viscosity and thixotropic action enabling running and sagging to be substantially eliminated. All thicknesses referred to in this application are measured on the dry film.

It is known from published experimental work that as the proportion of a polar solvent in admixture with aromatic solvents such as toluene and/or xylene is reduced from about 10% to 0% in the presence of a given proportion of bentonite clay-organic base reaction product such as the "Bentone" thickening agents, that the viscosity of the mixture decreases. In the invention, the presence of vinyl chloride-vinylidene chloride copolymer in the solution as well as the proportion of the copolymer in the solution is relied upon to reverse this trend so that a rapid increase in viscosity is achieved upon flash removal of polar solvent despite the reverse indication logically derivable from the known action of bentone thickening agents and polar solvents in aromatic hydrocarbon solvent medium.

In accordance with the present invention, aromatic solvent-soluble copolymers of vinyl chloride and vinylidene chloride are dissolved in an amount of from 15–35% by weight based on the weight of the solution in a solvent medium containing at least 70% by weight of a liquid non-polar mono-nuclear aromatic hydrocarbon solvent selected from the group consisting of benzene, toluene, xylene, ethyl benzene and mixtures thereof and from 4–25% by weight of a volatile polar solvent selected from the group consisting of acetone, methyl ethyl ketone and mixtures thereof, and there is incorporated in the solution from 1–6% by weight based on the total weight of the coating composition of a thickening agent which is a reaction product of an acidic clay with a basic organic compound.

To provide optimum solubility in the largely aromatic hydrocarbon solvent medium, the copolymers of vinyl chloride and vinylidene chloride specified preferably contain vinyl chloride and vinylidene chloride in proportions of from 30/70 to 75/25, inclusive, and have a specific viscosity of substantially 0.12 to 0.30 determined at 25° C. in 0.4% solution in nitrobenzene. These copolymers are preferably dissolved in the solvent medium in an amount of from 20–30% by weight based on the weight of the solution.

The aromatic hydrocarbon solvent component of the solvent medium may include a minor proportion of somewhat higher boiling commercial aromatic mixtures such as Solvesso 100 and Solvesso 150. Preferably, at least a major proportion of the aromatic solvent component is xylene.

The solvent medium desirably includes from 5–20% and preferably from 6–15% by weight of a volatile polar solvent selected from the group consisting of acetone and methyl ethyl ketone. Acetone is the preferred polar solvent. It is preferred in accordance with the invention that the acetone or methyl ethyl ketone volatile polar solvent component be free from large amounts of other polar solvents. Thus, and with reference to other low boiling solvents which have the capacity to be substantially immediately removed upon spray application, only methanol and ethanol may be used in any substantial quantity, and these are preferably employed in amounts of less than 25% by weight based on the weight of the polar solvent component.

The solvent medium may contain up to about 5% by weight, based on the weight of the medium, of polar solvent which does not volatilize appreciably during spray application such as methyl isobutyl ketone or cyclohexanone. The presence of the higher boiling polar solvent somewhat improves coalescence of the spray droplets into a smooth and continuous film although this component is not necessary for this purpose since adequate coalescence of the spray droplets occurs in the absence of the higher boiling polar solvent.

With the exception of the polar component specified above, the solvent medium consists essentially of the liquid, substantially non-polar mono-nuclear aromatic hydrocarbon solvents specified hereinbefore.

The thickening agent which is a reaction product of an acidic clay with a basic organic compound is incorporated in the solvent solution of vinyl chloride-vinylidene chloride copolymer in an amount of from 1–6% by weight, preferably from 1.5–3% by weight based on the total weight of the coating composition.

Preferred acidic clays are those exhibiting comparatively high base-exchange properties. These include the montmorillonites, e.g., sodium, potassium, lithium and other bentonites such as Wyoming bentonite, magnesium bentonite and saponite. Other clays are montronite, attapulgite, illite, zeolites and fuller's earths.

The base-exchange capacities of the various clays enumerated run from about 15 to about 100 milliequivalents of exchangeable ion per 100 grams of clay.

The basic materials which are reacted with the acidic clays are preferably strongly basic and include quaternary ammonium hydroxides such as dimethyl dioctadecyl ammonium hydroxide, amines such as octadecyl amine and oxime compounds such as ethyl methyl ketoxime, acetoxime, 2-butanone oxime, trimethoxyboroxime, dimethyl glyoxime and alpha-piccoline. The primary amines are preferred although the secondary and tertiary amines as well as hydroxyl amines such as octadecyl hydroxyl amine may be used. Amides such as octadecyl amide may also be employed. Polyamines such as tallow-aliphatic-diamine and polyamides such as the reaction product of dimeric fatty acids with aliphatic diamines are also useable.

Additionally, aliphatic, cyclic, aromatic and heterocyclic amines and polyamines as well as quaternary ammonium compounds may be used for reaction with the acidic clays. These are illustrated by octadecylamine, cyclohexylamine, octyl phenyl amine, pyrrole, tetraethylene pentamine and octadecyl ammonium chloride.

Compounds having a molecular weight in excess of 300 are preferred.

Additionally, the organic base which may be reacted with the acidic clay may be constituted by onium base compounds which are isologs of ammonium. Thus, phosphonium, arsonium, stibonium, oxonium, sulfonium, selenconium, stannonium and iodonium compounds such as base salts, illustrated by octylphosphonium iodide and free salts illustrated by octylphosphonium may be reacted with the acidic clays to form thickening agents which may be used in accordance with the invention.

The coating compositions of the invention preferably include suspended pigment, the total of resin solids, acidic clay reaction product and suspended pigment providing a total solids content of at least about 25%, preferably at least 30%, by weight based on the total weight of the solution.

The solutions broadly described above have a viscosity in the range of 100–210 seconds measured in a No. 4 Ford cup at 80° F. and are sufficiently fluid to permit spray application, desirably by conventional mechanical spray procedures which preferably include delivery of the fluid solution to the spray head under gauge pressures of from 5 to 80 lbs./sq. in., atomization being effected using gauge pressures of from 20 to 100 lbs./sq. in. Spraying is conveniently effected using a conventional maintenance spray gun such as the De Vilbiss MBC gun using a number 704 or 765 air cap. Conveniently, the gun to target distance is from about 5 to about 14 in. and, in accordance with conventional spray application, a 50% overlap is made with each gun pass.

If additional initial fluidity is desired to facilitate spray application, the solution sprayed may be thinned by increasing the proportion of total solvent or by increasing the proportion of volatile polar solvent in the solvent medium. Also, the conditions of spraying may be modified, if required, as by increasing the temperature of the solution being sprayed or by increasing spray pressure. The invention is particularly directed to room temperature spray procedure using practical spray pressures to provide an economical spray system.

The spray particles with their large surface areas in contact with the atmosphere lose volatile polar solvent substantially instantly during application. This is not to state that all of the volatile solvent component is lost upon spray application but merely that a substantial proportion of volatile solvent is eliminated from the coating solution between the time the coating composition leaves the spray head and the time that the spray particles are deposited and form a film upon the surface to be coated. The proportion of volatile solvent which is lost in this manner will vary considerably depending upon such factors as the temperature of the coating solution being sprayed, the temperature of the atmosphere, the temperature of the surface being coated and the volatility of the selected volatile polar solvent. The important point to observe is that the invention employs a solution of spray viscosity and deposits upon the surface being coated substantially at the instant of application, a solution containing a substantially reduced proportion of polar solvent component in comparison with the initial concentration of polar solvent component in the solution which is sprayed. This provides, in the combination environment of the invention, a spray deposit which is very viscous and thixotropic and which resists running and sagging in thick layers.

In the invention, the flash removal of a small amount of polar solvent produces large and unexpected changes in the character of the solution. First, the loss of polar solvent effects a small increase in the proportion of resin solids. Secondly, the proportion of aromatic solvent in the solvent medium also increases. In the presence of a large proportion of dissolved vinyl chloride-vinylidene chloride copolymer, and in the presence of the acidic clay-organic base reaction product, the small increase in resin solids content and aromatic solvent content effects a very rapid increase in viscosity and thixotropy leading to a condition approaching gelation.

It will be appreciated that the act of spraying subjects the coating solution to considerable shearing forces. Accordingly, there is a momentary reduction in viscosity and thixotropy due to the high shear applied by spray application. Accordingly, the spray particles which are deposited are constituted by tiny droplets of solution which, at least momentarily, possess a reduced viscosity. Thus, the spray droplets flow together to form a relatively continuous film which rapidly thickens to form a gel-like film which resists running and sagging despite unusual thickness which may approach 20 mils. As a result, a single spray application in accordance with the invention is capable of providing layers which have a thickness of from 5 to 20 mils and which air dry to form smooth and continuous protective coatings. It will be appreciated that the production of maintenance coatings in the field necessitates hand spray application of the coating compositions. The cost of application is, therefore, high and the elimination of a plurality of coats in accordance with the invention effects an important and valuable economy.

A specific example of a suitable vinyl chloride-vinylidene chloride copolymer containing 60% by weight of vinyl chloride and 40% by weight of vinylidene chloride is provided by reacting 82 parts of vinyl chloride with 18 parts of vinylidene chloride in a glass container at 20° C., reaction being effected by exposure, with agitation, to ultra-violet light, such as may be provided with a 100 watt G.E.–7 mercury vapor lamp. After 36–72 hours of such treatment, the resulting mixture of copolymer and unreacted monomers is removed from the container and dried to remove unreacted monomers. This specific example of aromatic solvent-soluble vinyl chloride-vinylidene chloride copolymer is representative of those copolymers which may be used in accordance with the invention and will be referred to as copolymer A.

The aromatic solvent-soluble copolymers of vinyl chloride with vinylidene chloride which may be used in the invention include those described in Daniel M. Gray and George L. Reymann Patents 2,675,334 and 2,780,564. These copolymers are substantially free of homopolymers of vinyl chloride and vinylidene chloride and of copolymers thereof outside of the previously set forth range of proportions and are characterized by complete solubility in toluene in a 25% solid solution at room temperature. Chlorinated copolymers may also be employed, particularly when the copolymer contains less than 45% by weight of vinylidene chloride with the remainder of said copolymer being vinyl chloride and the extent of chlorination is such as to increase the chloride content of the copolymer by from 3 to 8% on a weight basis.

It is preferred, in order to achieve improved adhesion to metal, to include a small proportion (up to about 30% by weight based on the weight of copolymer of vinyl chloride and vinylidene chloride) of an adhesion promoting agent in the compositions of the invention although this is not essential. Various agents promoting adhesion may be employed.

Preferred resinous adhesion promoting agents are copolymers of a mixture of ingredients consisting essentially of (1) 60–95% by weight of a vinyl halide, (2) 0.1–5% by weight of a monomer selected from the group consisting of aliphatic alpha, beta-mono-olefinic carboxylic acids, anhydrides of said acids and alkyl esters of said acids, and (3) the balance of said mixture being a monomer selected from the group consisting of vinyl esters of lower saturated fatty acids and alkyl esters of aliphatic alpha, beta-mono-olefinic carboxylic acids. Suitable copolymers within the class defined are disclosed in the copending application of George L. Reymann and George W. Gerhardt, Serial No. 600,414, filed July 27, 1956, now U.S. Patent No. 2,941,974, the disclosure of which is hereby incorporated. These compositions are preferably illustrated by Bakelite's "Vinylite VMCH," which has a specific viscosity of 0.53 determined in 1.0% solution in cyclohexanone at 20° C. and which contains about 86% vinyl chloride, 1% maleic acid, and 13% vinyl acetate.

Adhesion to metal may also be improved by the presence of alkaline saponified copolymers of vinyl chloride and vinyl acetate containing from about 80–92% by weight of vinyl chloride prior to saponification and which have been treated to provide a vinyl alcohol content of from 2–10% by weight, preferably from 3–6% by weight and an average unsaturation indicated by a corrected iodine number of from 2 to 10. The copolymers which may be employed are more fully defined in the copending application of Henry J. Bach and Edward J. Esswein, Jr., Serial No. 720,065, filed March 10, 1958. The disclosure of which is hereby incorporated herein. Desirably, the vinyl chloride-vinyl acetate copolymer has a molecular weight in the range of from 5000 to 9000 and saponification is performed in slurry medium under controlled saponification conditions as described at length in the copending application of Xavier V. Laporta, filed October 25, 1957, Serial No. 692,033, now U.S. Patent No. 3,021,318, the disclosure of which is hereby incorporated.

Adhesion may also be improved by the incorporation in the compositions in the invention of an oleoresinous varnish base consisting of drying oil heated with oil-soluble, non-heat hardening varnish resin having a drying oil/varnish resin ratio in the range of 20/80 to 67/33, inclusive, as is more fully described in United States Patent No. 2,780,564 to Daniel M. Gray and George L. Reymann.

A further preferred manner of improving adhesion as well as other film properties is by the incorporation in the compositions of the invention of copolymers of fumarated soya oil with a methacrylate ester, preferably methyl methacrylate. In addition to adhesion, a notable improvement in surface gloss is obtained. Mixtures of methacrylate and acrylate esters may be employed in place of pure methacrylate ester in the copolymer. A suitable copolymer is illustrated by a copolymer of 20 parts by weight of fumarated soya oil (containing a weight ratio of 28 parts of fumaric acid to 72 parts of soya oil) with 26.7 parts of ethyl acrylate and 53.3 parts of methyl methacrylate. In preparing this copolymer, soya oil is first reacted with fumaric acid by heating at 240–260° C. until a clear product having an iodine number of about 180 is obtained. The fumarated soya oil product is copolymerized with the acrylic ester monomers by solvent solution copolymerization at reflux in toluene solution in the presence of benzoyl peroxide (e.g., 3% by weight based on the weight of fumarated soya oil and acrylic monomers) as a free-radical polymerization catalyst.

The invention is illustrated in the examples which follow.

*Example I*

A preferred composition in accordance with the invention is produced by dissolving 15.43 parts of copolymer A and 2.00 parts of "VMCH" as adhesion promoting resin in a mixture of 10.77 parts of toluene, 36.25 parts of xylene, 4.80 parts of acetone and 0.02 part of propylene oxide. In this solution there was ground 2.90 parts of dimethyldioctadecyl ammonium bentonite and 12.25 parts of titanium dioxide, rutile pigment supplied as a paste dispersed in 12.49 parts toluene, 3.06 parts of copolymer A and 0.03 part of propylene oxide. The composition so produced was sprayable.

In this composition there was present 21.5% by weight of copolymer A in the solvent medium which contained 7.72% of acetone based on the weight of the solvent mixture. Considering the same composition prior to dilution with acetone, the composition was too viscous to permit spraying. Acetone dilution produced a composition having a viscosity of 150 seconds which was sprayable to provide films having a thickness in excess of 5 mils which air dried to form smooth and uniform coatings without running and sagging, spray application being effected using a De Vilbiss MBC gun with a number 704 air cap, a delivery pressure of 20 lbs./sq. in. and an atomization pressure of 65 lbs./sq. in., the composition being supplied to the spray gun at room temperature.

*Example II*

Example I was repeated omitting the 2.90 parts of dimethyldioctadecyl ammonium bentonite. Using the same spray procedure, the application of coatings having a thickness in excess of 1.5 mils produced undesirable running and sagging.

*Example III*

Example I was repeated using methyl ethyl ketone as partial replacement (50% by weight) and also as complete replacement for the acetone component (the total weight of polar solvent remaining constant). The results were essentially comparable to those obtained in Example I and smooth and continuous coatings having a thickness in excess of 5 mils were obtained without running and sagging.

*Example IV*

Example I was repeated using 22 parts of copolymer A and 6 parts of acetone (9.5% based on total solvent). Satisfactory thick coatings were obtainable.

*Example V*

Example I was repeated using 6 parts of acetone and 4 parts of dimethyldioctadecyl ammonium bentonite. Satisfactory thick coatings were obtainable.

*Example VI*

Example I was repeated using 50 parts of toluene and 6 parts of Solvesso 100 in place of the proportion of toluene and xylene set forth in Example I. Satisfactory thick films were obtainable.

Solvesso 100 is a commercial aromatic solvent-soluble solution having the following physical and chemical characteristics.

| | |
|---|---|
| Specific gravity at 60/60° F | 0.8749 |
| Flash, ° F. (Tag closed cup) min | 100 |
| Distillation ASTM (D268): | |
|     Initial boiling point, ° F | 306 |
|     10% | 311 |
|     50% | 317 |
|     90% | 327 |
|     Dry point, ° F | 343 |
| Viscosity, cp. at 25° C | 0.797 |

*Example VII*

Example VI was repeated using Solvesso 150 in place of Solvesso 100. Satisfactory thick films were obtained.

Solvesso 150 is a commercial aromatic solvent-soluble solution having the following physical and chemical characteristics.

| | |
|---|---|
| Specific gravity at 60/60° F | 0.8919 |
| Flash, ° F. (Tag closed cup) min | 150 |
| Distillation ASTM (D268): | |
|     Initial boiling point, ° F | 375 |
|     10% | 380 |
|     50% | 387 |
|     90% | 392 |
|     Dry point, ° F | 398 |
|     Final boiling point, ° F | 410 |
| Viscosity, cp. at 25° C | 1.193 |

Various pigments, dyes, waxes and other non-reactants including light stabilizers and heat stabilizers for the vinyl chloride-vinylidene chloride copolymer component such as those illustrated in the United States patents to Matlack et al., 2,605,244, and Fischer et al., 2,801,988, may be added to the compositions of the invention for decorative purposes and the like, without otherwise materially affecting the significant characteristics of the composition.

I claim:

1. A coating composition comprising a solvent solution containing from 15-35% by weight, based on the weight of the solution, of an aromatic solvent-soluble copolymer of vinyl chloride and vinylidene chloride dissolved in a solvent medium containing at least 70% by weight, based on the weight of the solvent medium, of a liquid, substantially non-polar mono-nuclear aromatic hydrocarbon solvent comprising, in major proportion, a solvent selected from the group consisting of toluene, xylene, ethyl benzene and mixtures thereof, said solvent medium including from 4-25% by weight, based on the weight of total solvent, of a volatile polar solvent selected from the group consisting of acetone, methyl ethyl ketone and mixtures thereof, said coating composition containing from 1-6% by weight, based on the weight of the solution, of a thickening agent which is a reaction product of an acidic clay with a basic organic compound.

2. A coating composition as recited in claim 1 in which said acidic clay has a base-exchange capacity of from 15-100 millequivalents of exchangeable ion per 100 grams of clay.

3. A coating composition as recited in claim 2 in which said clay is reacted with an onium base compound.

4. A coating composition as recited in claim 2 in which said clay is reacted with an organic quaternary ammonium base.

5. A coating composition as recited in claim 4 in which said quateranry ammonium base has a molecular weight in excess of 300.

6. A coating composition as recited in claim 1 in which said composition includes suspended pigment, the total solids content of said composition being at least 25% by weight.

7. A coating composition as recited in claim 6 in which said composition has a viscosity in the range of 100-210 seconds measured in a No. 4 Ford cup at 80° F.

8. A coating composition comprising a solvent solution containing from 15-35% by weight, based on the weight of the solution, of an aromatic solvent-soluble copolymer of vinyl chloride and vinylidene chloride in proportions of 30/70 to 75/25, inclusive, and having a specific viscosity of substantially 0.12 to 0.30 determined at 25° C. in 0.4% solution in nitrobenzene dissolved in a solvent medium containing at least 70% by weight, based on the weight of the solvent medium, of a liquid, substantially non-polar mono-nuclear aromatic hydrocarbon solvent comprising, in major proportion, a solvent selected from the group consisting of toluene, xylene, ethyl benzene and mixtures thereof, said solvent medium including from 4-25% by weight, based on the weight of total solvent, of a volatile polar solvent selected from the group consisting of acetone, methyl ethyl ketone and mixtures thereof, said coating composition containing from 1-6% by weight, based on the weight of the solution, of a thickening agent which is a reaction product of an acidic clay with a basic organic compound.

9. A coating composition as recited in claim 8 in which said copolymer is dissolved in an amount of from 20-30% by weight based on the weight of the solution.

10. A coating composition as recited in claim 9 in which said volatile polar solvent is present in said solvent medium in an amount of from 5-20% by weight thereof.

11. A coating composition as recited in claim 9 in which said volatile polar solvent is present in said solvent medium in an amount of from 6-15% by weight thereof.

12. A coating composition as recited in claim 11 in which said volatile polar solvent is acetone.

13. A coating composition as recited in claim 8 in which said composition includes up to 5% by weight based on the weight of the solvent medium of a polar solvent which does not volatilize appreciably upon spray application at room temperature.

14. A coating composition as recited in claim 8 in which said volatile polar solvent includes up to 25% of its weight of a lower alcohol selected from the group consisting of methanol and ethanol.

15. A method of spray coating a solution comprising an aromatic hydrocarbon solvent solution containing dissolved aromatic solvent-soluble copolymer of vinyl chloride and vinylidene chloride to provide a coating having a thickness of at least 5 mils using a single spray application and without extensive running and sagging of the deposited film comprising providing a coating composition comprising a solvent solution containing from 15-35% by weight, based on the weight of the solution, of an aromatic solvent-soluble copolymer of vinyl chloride and vinylidene chloride dissolved in a solvent medium containing at least 70% by weight, based on the weight of the solvent medium, of a liquid, substantially non-polar mono-nuclear aromatic hydrocarbon solvent comprising, in major proportion, a solvent selected from the group consisting of toluene, xylene, ethyl benzene and mixtures thereof, said solvent medium including from 4-25% by weight, based on the weight of total solvent, of a volatile polar solvent selected from the group consisting of acetone, methyl ethyl ketone and mixtures thereof, said coating composition containing from 1-6% by weight, based on the weight of the solution, of a thickening agent which is a reaction product of an acidic clay with a basic organic compound, and spraying said coating composition to thereby effect flash removal of at least a portion of said volatile solvent and deposit a coating which has a thickness of at least 5 mils and which will coalesce and rapidly thicken to form a continuous film which resists running and sagging.

16. A method as recited in claim 15 in which spraying is effected by supplying said coating composition at about room temperature to a spray head under pressure of from 5-80 pounds per square inch and atomization of said coating composition is effected using an atomizing pressure of from 20-100 pounds per square inch.

17. A method as recited in claim 15 in which said coating composition has an initial viscosity of from 100–210 seconds measured in a No. 4 Ford cup at 80° F.

18. A method as recited in claim 15 in which said copolymer of vinyl chloride and vinylidene chloride contains vinyl chloride and vinylidene chloride in proportions of 30/70 to 75/25, inclusive, and has a specific viscosity of substantially 0.12 to 0.30 determined at 25° C. in 0.4% solution in nitrobenzene, said copolymer being dissolved in said solution in an amount of from 20–30% by weight and said volatile polar solvent being present in said solvent medium in an amount of from 5–20% by weight.

19. A method as recited in claim 15 in which said aromatic hydrocarbon solvent comprises a major proportion of xylene.

References Cited in the file of this patent

UNITED STATES PATENTS

| | | |
|---|---|---|
| 2,036,837 | Stephenson | Apr. 7, 1936 |
| 2,367,880 | Lindh | Jan. 23, 1945 |
| 2,918,445 | Tarwid | Dec. 22, 1959 |
| 2,940,874 | Barnes | June 14, 1960 |
| 2,941,974 | Reymann et al. | June 21, 1960 |
| 2,946,702 | Bach | July 26, 1960 |

OTHER REFERENCES

Condensed Chemical Dictionary, Rose, 1956, page 138 "Bentone 18c."